US009287707B2

(12) United States Patent
Tiruvuru

(10) Patent No.: US 9,287,707 B2
(45) Date of Patent: Mar. 15, 2016

(54) SYSTEM AND METHOD FOR PROVIDING POWER TO CIRCUITS UNTIL POWER SUPPLY TURNS ON AND SUPPLIES POWER

(71) Applicant: Marvell World Trade LTD., St. Michael (BB)

(72) Inventor: Rajesh Tiruvuru, Nagalapuram (IN)

(73) Assignee: Marvell World Trade LTD., St. Michael (BB)

( * ) Notice: Subject to any disclaimer, the term of this patent is extended or adjusted under 35 U.S.C. 154(b) by 243 days.

(21) Appl. No.: 14/143,502

(22) Filed: Dec. 30, 2013

(65) Prior Publication Data

US 2014/0111011 A1    Apr. 24, 2014

Related U.S. Application Data

(63) Continuation of application No. 12/970,555, filed on Dec. 16, 2010, now Pat. No. 8,618,785.

(60) Provisional application No. 61/289,897, filed on Dec. 23, 2009.

(51) Int. Cl.
G05F 1/40 (2006.01)
H02J 3/00 (2006.01)
H02M 1/36 (2007.01)
G05F 1/44 (2006.01)

(52) U.S. Cl.
CPC .. *H02J 3/00* (2013.01); *H02M 1/36* (2013.01); *G05F 1/44* (2013.01); *Y10T 307/469* (2015.04)

(58) Field of Classification Search
CPC .............. G05F 1/40; G05F 1/44; G05F 1/46; H02M 1/36; H02J 3/00
See application file for complete search history.

(56) References Cited

U.S. PATENT DOCUMENTS

| 4,072,890 A | 2/1978 | Westbrook et al. |
| 4,553,082 A | 11/1985 | Nesler |
| 4,859,921 A | 8/1989 | Archer |
| 5,359,281 A | 10/1994 | Barrow et al. |
| 5,546,043 A | 8/1996 | Pollmeier |

(Continued)

FOREIGN PATENT DOCUMENTS

| CN | 1378285 A | 11/2002 |
| DE | 3304759 A1 | 8/1984 |

OTHER PUBLICATIONS

Chinese Office Action for Chinese Application No. 201080049984.2 dated Aug. 22, 2014; 9 Pages.

(Continued)

*Primary Examiner* — Matthew Nguyen

(57) ABSTRACT

A system for a power supply, wherein the power supply is configured to receive an alternating current voltage and supply an output voltage, the system including a switch and a control circuit. The switch receives the alternating current voltage and charges, in response to the power supply receiving the alternating current voltage and not supplying the output voltage, a capacitance to a first voltage. The first voltage is output to a first circuit controlling the power supply while the power supply is receiving the alternating current voltage and not supplying the output voltage. The control circuit deactivates the switch in response to the power supply receiving the alternating current voltage and supplying the output voltage. In response to the control circuit deactivating the switch, the switch stops charging the capacitance, and the first circuit receives the output voltage of the power supply.

16 Claims, 5 Drawing Sheets

(56) References Cited

U.S. PATENT DOCUMENTS

| | | | |
|---|---|---|---|
| 5,559,395 A | 9/1996 | Venkitasubrahmanian et al. | |
| 5,608,614 A * | 3/1997 | Ohnishi | H02M 1/4208 307/110 |
| 5,712,774 A | 1/1998 | Uramoto | |
| 6,075,715 A * | 6/2000 | Maehara | H02M 1/425 363/132 |
| 6,229,681 B1 | 5/2001 | Lee | |
| 6,369,109 B1 | 4/2002 | Debatin et al. | |
| 6,369,409 B1 | 4/2002 | Takasu et al. | |
| 7,609,036 B2 | 10/2009 | Bartolo et al. | |
| 8,482,945 B2 * | 7/2013 | Kojima | B60L 11/1811 363/52 |
| 2002/0134999 A1 | 9/2002 | Hirokawa et al. | |
| 2003/0057871 A1 | 3/2003 | Kominami et al. | |
| 2006/0034109 A1 | 2/2006 | Benabdelaziz et al. | |
| 2006/0062026 A1 | 3/2006 | Wittenbreder | |
| 2007/0274104 A1 | 11/2007 | Furukoshi et al. | |
| 2009/0166720 A1 | 7/2009 | Zundel | |
| 2009/0230870 A1 | 9/2009 | Quazi | |
| 2011/0042726 A1 | 2/2011 | Banerjee et al. | |
| 2013/0336028 A1 * | 12/2013 | Kawamura | H02M 7/125 363/53 |

OTHER PUBLICATIONS

PCT International Search Report for Application No. PCT/IB10/03465; Jun. 14, 2011; 2 pages.

PCT International Search Report for Application No. PCT/US2012/037460; Aug. 7, 2012; 5 pages.

PCT International Search Report for Application No. PCT/US2012/037466; Jun. 20, 2013; 4 pages.

* cited by examiner

SYSTEM AND METHOD FOR PROVIDING POWER TO CIRCUITS UNTIL POWER SUPPLY TURNS ON AND SUPPLIES POWER

CROSS REFERENCE TO RELATED APPLICATIONS

This is a continuation of U.S. patent application Ser. No. 12/970,555 (now U.S. Pat. No. 8,618,785), filed on Dec. 16, 2010, which claims the benefit of U.S. Provisional Application No. 61/289,897, filed on Dec. 23, 2009. The entire disclosures of the above applications are incorporated herein by reference.

BACKGROUND

Particular embodiments generally relate to power supplies.

Unless otherwise indicated herein, the approaches described in this section are not prior art to the claims in this application and are not admitted to be prior art by inclusion in this section.

A switched mode power supply (SMPS) regulates an input voltage to provide an output voltage. A power factor correction (PFC) controller is used in the conversion and regulation. The PFC controller typically requires a minimumsupply voltage to operate. During operation, the output voltage of the SMPS is used to supply the required operating voltage for the PFC controller. However, at certain times, such as during the SMPS power-up or when a device is in a standby mode (e.g., the output voltage of the SMPS is down), an input voltage is needed for a PFC controller.

A start-up supply may be used to supply the operating voltage for the PFC controller during the start-up and when the device is in the standby mode. The operating voltage is supplied until the SMPS powers up. After the SMPS powers up, the start-up supply is then deactivated until needed again.

SUMMARY

In one embodiment, an apparatus includes a transistor having a gate, a drain, and a source. The drain is coupled to receive an alternating current (AC) power supply signal. A component is coupled between an output node and the gate of the transistor. The component couples an output voltage from the output node to charge a gate-source capacitor during a first portion of the AC power supply signal. The transistor is configured to turn on during a second portion of the AC supply signal to send a charge to the output node where the charge is used to power a circuit of a power supply.

In one embodiment, the component includes a first component and the apparatus further includes a second component coupled to the source of the transistor and the output node. The second component causes the source of the transistor to follow the AC power supply signal until the transistor turns on.

In one embodiment, a switch is configured to be controlled to discharge the gate-source capacitor.

In one embodiment, a system includes a capacitor configured to be charged when the transistor is turned on.

In one embodiment, a method includes: coupling an AC power supply signal to a transistor; coupling an output voltage from an output node to a gate of the transistor to charge a gate-source capacitor; and turning the transistor on to send a charge to the output node, the charge being used to power a circuit of a power supply.

The following detailed description and accompanying drawings provide a more detailed understanding of the nature and advantages of the present invention.

DETAILED DESCRIPTION

Described herein are techniques for a start-up supply. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
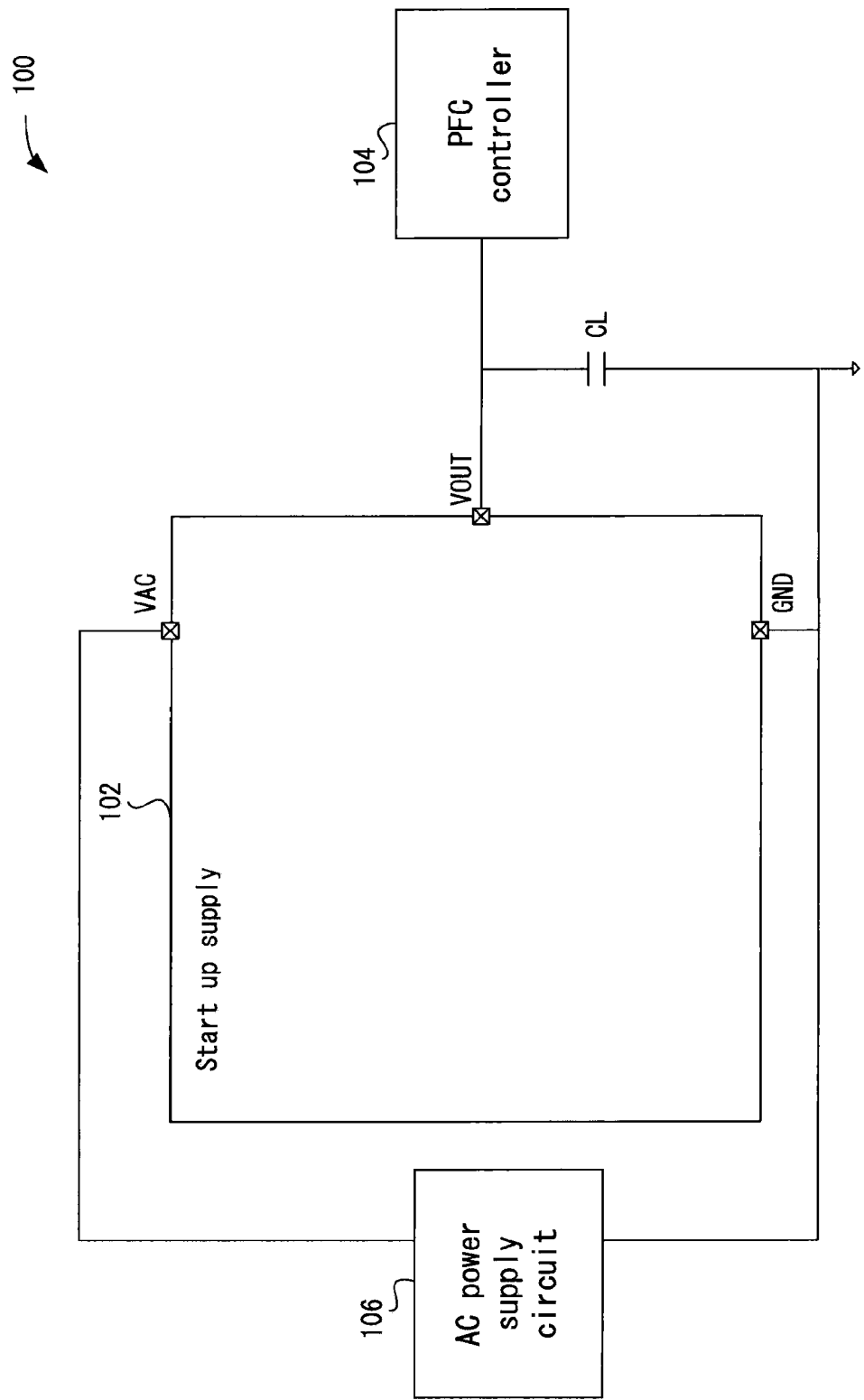
FIG. 1 depicts an example of a switched mode power supply (SMPS) according to one embodiment.

FIG. 1 depicts an example of a switched mode power supply (SMPS) 100 according to one embodiment. A start-up supply 102, a power factor correction controller 104, and an alternating current (AC) power supply circuit 106 are provided. Although a switched mode power supply is discussed, particular embodiments may be used with other power supply configurations that require start-up supply 102.

AC power supply circuit 106 provides an AC signal to a node VAC of start-up supply 102. As will be described in more detail below, a half-rectified signal may be provided to node VAC.

Start-up supply 102 is configured to receive the AC power supply signal and provide an output signal at a node VOUT to charge a capacitor CL. Capacitor CL is charged to supply a sufficient voltage to PFC controller 104 during times when SMPS 100 is not supplying a sufficient auxiliary voltage. The auxiliary voltage may be from the output voltage of SMPS 100, which is different than the output voltage Vout of start-up supply 102. The auxiliary voltage of SMPS 100 may be the voltage that is being supplied to a computing device being powered by SMPS 100. The output voltage from start-up supply 102 and the auxiliary voltage may be a direct current (DC) voltage.

Start-up supply 102 may supply the necessary charge to capacitor CL, which provides the charge to PFC controller 104. The charge may be supplied during power-up of the computing device and also when the computing device is in a standby mode. When the computing device is starting up or in standby mode, the auxiliary voltage is down.

When SMPS 100 has started up and is providing a sufficient auxiliary voltage, the auxiliary voltage can be used to provide power to PFC controller 104. At this point, start-up supply 102 may not be needed. Thus, start-up supply 102 may be turned off (e.g., a transistor (not shown) in start-up supply 102 is turned off) such that start-up supply 102 is not supplying charge to capacitor CL. This state continues until start-up supply 102 is needed again, such as when the computing device is powered down and restarted, or when the computing device is in the standby mode and is restarted.

Start-up supply 102 may be included on an integrated circuit (IC) chip that includes three pins, a pin for node VAC, a pin for node VOUT, and a pin for ground (GND). By using only three pins, pin count is limited for the chip. Also, as will be described in more detail below, a voltage from node VOUT is used to provide a necessary voltage to charge a gate-source capacitor of a transistor (not shown) in start-up supply 102.

Figure 2:
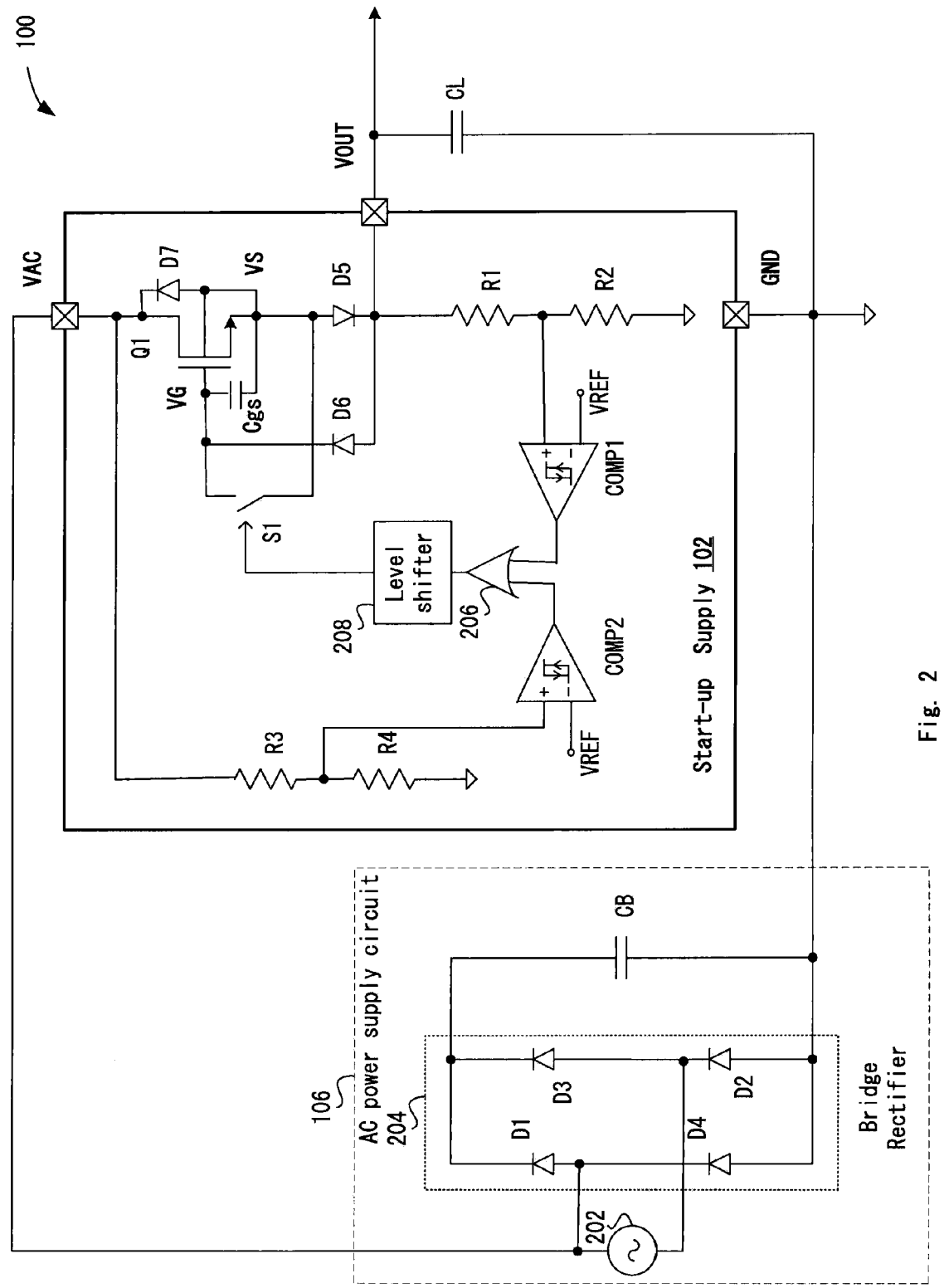
FIG. 2 depicts a more detailed example of the start-up supply according to one embodiment.

FIG. 2 depicts a more detailed example of the start-up supply 102 according to one embodiment. AC power supply circuit 106 includes an AC power source 202 and a bridge rectifier 204. AC power source 202 may provide an AC signal, such as a 220 volt root mean square (RMS) signal. Bridge rectifier 204 includes diodes D1, D2, D3, and D4. Bridge rectifier 204 may be a half wave rectifier, which takes the AC supply signal and blocks the negative half of the AC supply signal. In this case, the positive half of the AC supply signal is provided to node VAC of start-up supply 102.

A transistor Q1 receives the rectified AC power supply signal from node VAC and provides an output voltage at node VOUT. Transistor Q1 has its drain coupled to node VAC. Also, the body of transistor Q1 is coupled to a source of transistor Q1 and a diode D7 is coupled through the body to the drain of transistor Q1. A gate-source capacitor Cgs is shown to represent the capacitance between the gate and source of transistor Q1.

A diode D5 couples the source to the output node VOUT. Also, the output node VOUT is coupled to the gate of transistor Q1 through a diode D6. Particular embodiments use the output voltage VOUT to charge gate-source capacitor Cgs to a necessary drive voltage during at least a portion of the AC power supply signal. For example, as will be discussed in more detail below, the gate-source capacitor Cgs is charged while the AC power supply signal is negative. This allows transistor Q1 to turn on during a phase when conduction is permitted, but before the AC voltage becomes sufficient enough to start charging capacitor CL. The turn on time is determined by a conduction angle, which is the portion of a cycle of the AC power supply signal during which the transistor Q1 conducts.

Figure 3:
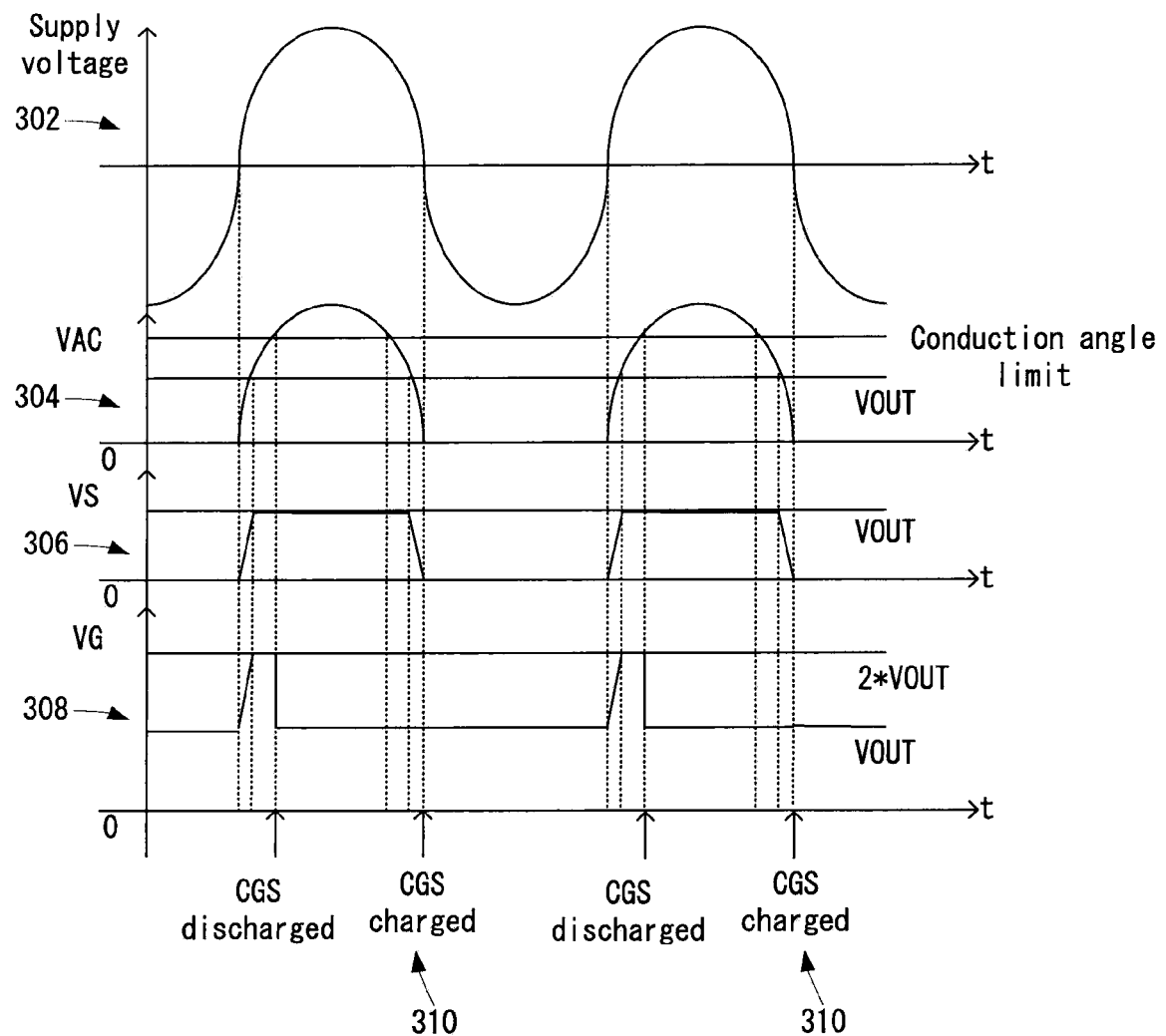
FIG. 3 depicts waveforms of the start-up supply according to one embodiment.

The operation of start-up supply 102 will be described with respect to FIG. 2 and FIG. 3. FIG. 3 depicts waveforms of SMPS 100 according to one embodiment. A graph 302 shows the AC power supply signal, a graph 304 shows the rectified AC power supply signal, a graph 306 shows the voltage at the source of transistor Q1, and a graph 308 shows the voltage at the gate of transistor Q1.

During the negative half cycle of the AC supply signal, the drain of transistor Q1 is held at a potential below ground (e.g., by a diode drop via diode D7) for a part or the entire period based on the load on capacitor CB on bridge rectifier 204.

When the voltage at node VAC is zero, gate-source capacitor Cgs is charged to the output voltage through diode D6. For example, the output voltage turns diode D6 on and capacitor Cgs is charged. A charging point is shown at 310 where the AC supply signal is negative.

When the positive cycle of AC supply signal starts, the VAC voltage at node VAC increases above zero. The source of Q1 (node VS) also follows the VAC voltage at node VAC due to having diode D5 in place. For example, diode D5 may be reverse biased until the source of transistor Q1 is sufficient to forward bias diode D5. The source of transistor Q1 follows the VAC voltage until the voltage VS becomes equal to a voltage VOUT (the diode drop across diode D5 is ignored for discussion purposes) when transistor Q1 starts conducting to charge capacitor CL. The voltage across gate-source capacitor Cgs does not change when the source of transistor Q1 moves above zero because there is no path from the gate of transistor Q1 to discharge gate-source capacitor Cgs. Accordingly, the voltage at the gate of transistor Q1 continues to provide sufficient drive to have transistor Q1 conducting.

Transistor Q1 conducts for a certain phase (according to the conduction angle) of the AC power supply signal. When the conduction angle ends, transistor Q1 is turned off to stop charging capacitor CL. The conduction angle is used to increase efficiency. For example, the efficiency is greater when the VAC voltage is smaller. Accordingly, as shown in FIG. 3, capacitor Cgs is discharged and transistor Q1 is turned off when the conduction angle is reached. At this point, capacitor CL is not being charged by start-up supply 102. Switch S1 may be closed to provide a path to discharge gate-source capacitor Cgs. The discharge of gate-source capacitor Cgs will be described in more detail below. By having transistor Q1 be OFF for the remaining portion of the AC power supply signal cycle after charging the output voltage VOUT adequately, higher power efficiency is achieved for the charging process.

The above process continues when the AC power supply signal goes negative and gate-source capacitor Cgs is charged. Then, transistor Q1 is turned on to charge capacitor CL when voltage VS becomes equal to a voltage VOUT.

As discussed above, the charge across capacitor CL is used to supply a voltage to PFC controller 104. The above process continues until SMPS 100 is powered up and a sufficient auxiliary voltage being output by SMPS 100 can be supplied to PFC controller 104. The auxiliary voltage may then be used to charge capacitor CL. At this point, transistor Q1 is turned off until it is needed again to provide a start-up charge.

Referring back to FIG. 2, output regulation and conduction angle regulation will be described in more detail. Output voltage regulation may be provided by a resistor R1, a resistor R2, and a comparator COMP1. Also, conduction angle regulation may be provided by a resistor R3, a resistor R4, and a comparator COMP2.

Output regulation is used to determine when to control switch S1 to turn off transistor Q1. At this point, SMPS 100 may be able to provide the auxiliary voltage to power PFC controller 104. In one embodiment, when a voltage input into the positive terminal of comparator COMP1 reaches a certain level as compared to a voltage reference VREF, switch S1 is controlled to be closed. In this case, gate-source capacitor Cgs cannot be charged to allow transistor Q1 to conduct. For example, when starting up, voltage VOUT may be below a voltage that causes the input into comparator COMP1 to be below the voltage reference VREF (via resistor divider of resistors R1 and R2). When SMPS 100 can supply the auxiliary voltage, voltage VOUT goes above a level where the input into comparator COMP1 goes above the voltage reference VREF. Comparator COMP1 then outputs a logic high signal. Logic gate (e.g., Or gate) 206 outputs a logic high signal to a level shifter 208. Level shifter 208 may be used to shift the voltage level to a level that may turn on a transistor (not shown) acting as the switch to close switch S1.

In conduction angle regulation, when a voltage input into the positive terminal of comparator COMP2 reaches a certain level compared with voltage reference VREF, switch S1 is controlled to discharge capacitor Cgs. For example, when the VAC voltage reaches a certain level, switch S1 is closed to discharge gate-source capacitor Cgs according to the conduction angle. The VAC voltage is divided by a resistor divider network of resistor R3 and resistor R4. When the input signal from the resistor divider network into comparator COMP2 goes above reference voltage VREF, comparator COMP2 outputs a logic high signal. Logic gate 206 outputs a logic high signal to level shifter 208. In one example, the output from comparator COMP2 may be a logic low level at this point (e.g., because the voltage VOUT is lower then reference voltage VREF because voltage VOUT has not reached the desired level during start up). Level shifter 208 shifts the voltage level to a level that may turn on the transistor (not shown) to close switch S1.

When the VAC voltage goes below a certain level, the signal input into comparator COMP1 goes below reference voltage VREF. Comparator COMP2 then outputs a logic low level, which turns off the transistor (not shown) and opens switch S1. The above process continues as switch S1 is closed and opened according to the conduction angle.

Figure 4:
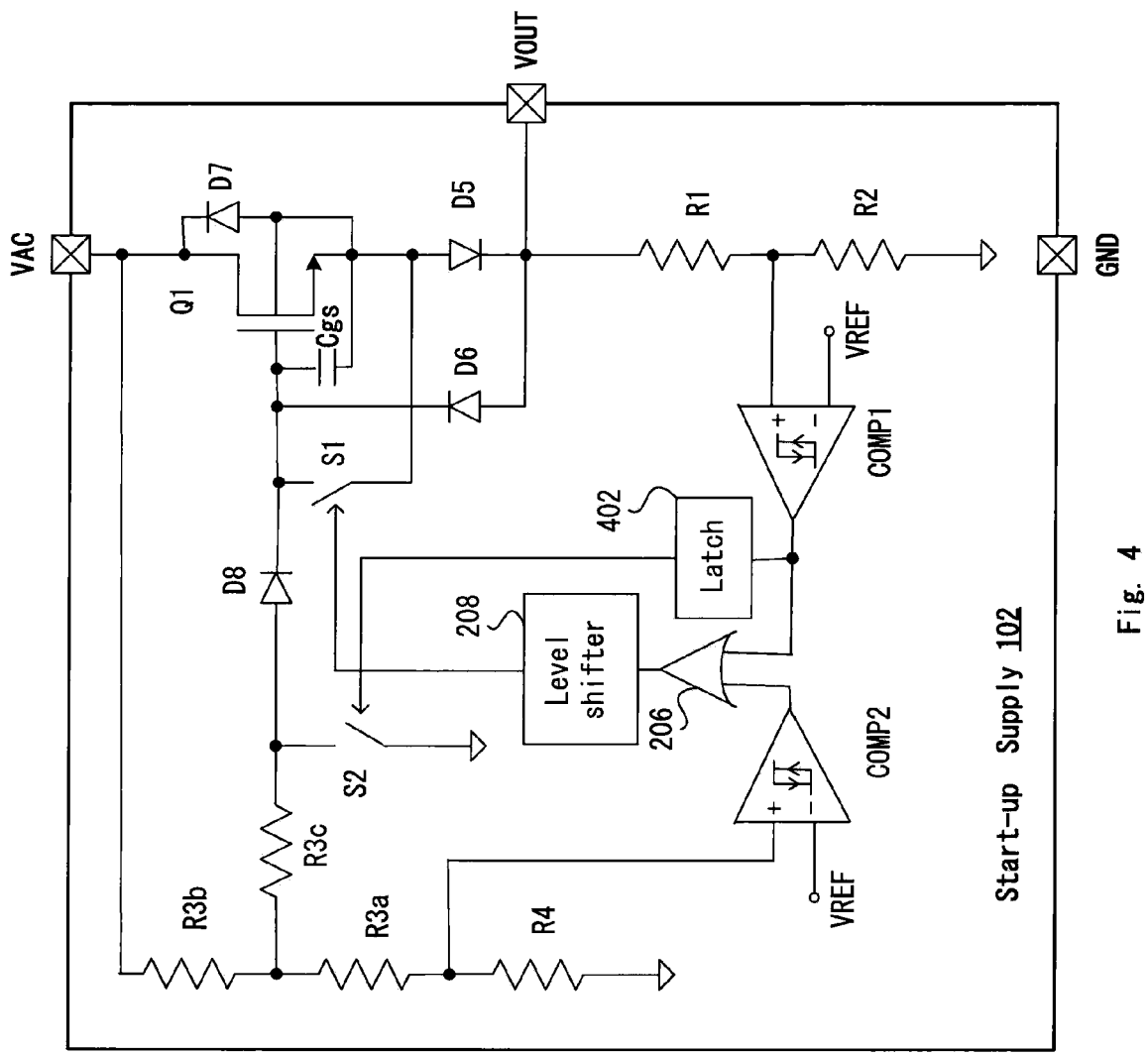
FIG. 4 depicts an example of a start-up supply to provide a path for charging gate-source capacitor Cgs from the AC power supply according to one embodiment.

At certain times, such as before power-up of SMPS 100, capacitor CL is relaxed or does not include a charge across it. Thus, the output voltage VOUT cannot be used to charge gate-source capacitor Cgs. Accordingly, start-up assistance is used to charge gate-source capacitor Cgs. FIG. 4 depicts an example of start-up supply 102 to provide a path for charging gate-source capacitor Cgs according to one embodiment. The VAC voltage is used to charge gate-source capacitor Cgs. Resistor R3 of FIG. 2 may be modified into resistors R3a, R3b, and R3c. This provides a path for charging gate-source capacitor Cgs from node VAC. For example, a path is provided through a resistor R3c and a diode D8 to charge gate-source capacitor Cgs.

Once capacitor CL is charged fully for the first time, this path is not needed. Rather, as was described above, output voltage VOUT is used to charge gate-source capacitor Cgs. Thus, a switch S2 is used to de-couple the path to charge gate-source capacitor Cgs. For example, when a voltage VOUT reaches a certain level, the output of comparator COMP1 goes high and a latch 402 is used to control switch S2. For example, switch S2 is closed to couple resistor R3c to ground. At this point, resistors R3a, R3b, R3c, and R4 together determine the conduction angle. Also, diode D8 prevents charge from flowing from the output voltage through resistor R3c.

Figure 5:
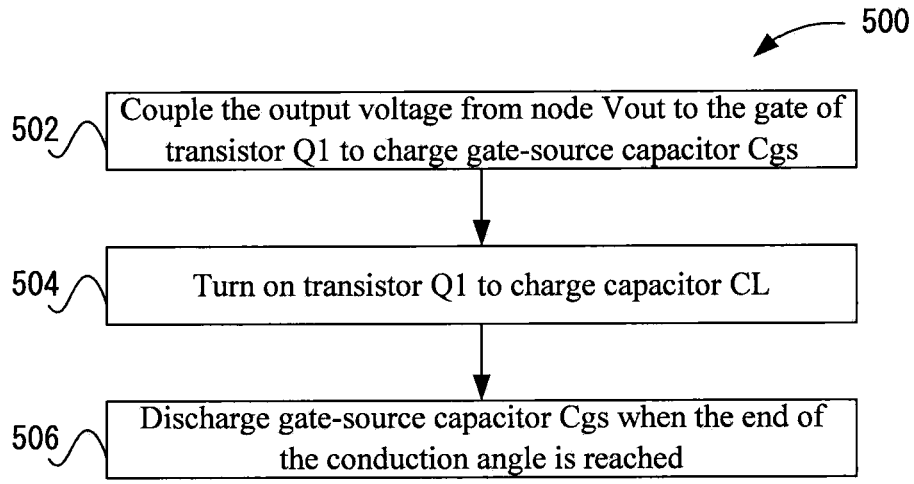
FIG. 5 depicts a simplified flow chart of a method for operating start-up supply according to one embodiment.

FIG. 5 depicts a simplified flow chart 500 of a method for operating start-up supply 102 according to one embodiment. At 502, the output voltage from node VOUT is coupled to the gate of transistor Q1 to charge gate-source capacitor Cgs. At 504, transistor Q1 is turned on to charge capacitor CL. At 506, when the end of the conduction angle is reached, gate-source capacitor Cgs is discharged.

Figure 6:
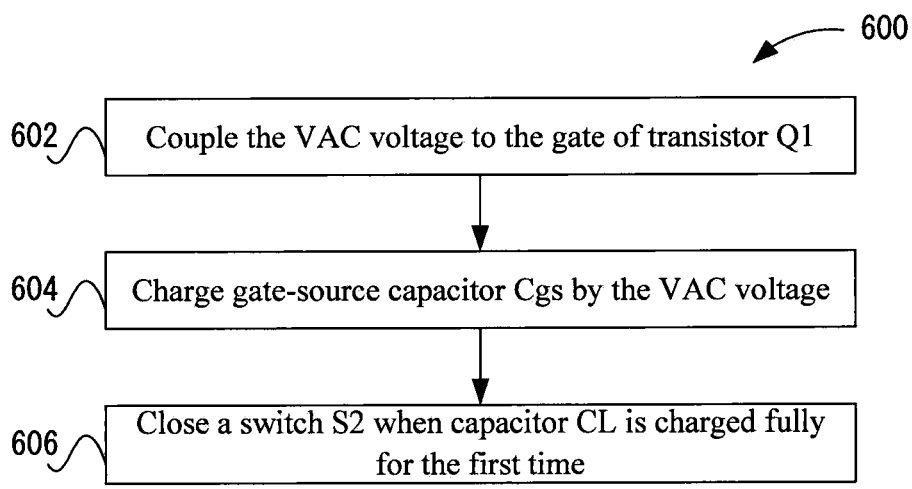
FIG. 6 depicts a simplified flowchart of a method for providing start-up assistance according to one embodiment.

FIG. 6 depicts a simplified flowchart 600 of a method for providing start-up assistance according to one embodiment. At 602, the VAC voltage is coupled to the gate of transistor Q1. At 604, gate-source capacitor Cgs is charged by the VAC voltage. At 606, switch S2 is closed when capacitor CL is charged fully for the first time.

Accordingly, particular embodiments provide a start-up supply that avoids a higher power dissipation because a second rectified signal that is off-chip is not used to charge gate-source capacitor Cgs. Rather, the output voltage VOUT is used to charge gate-source capacitor Cgs. This avoids the use of an extra resistor that is coupled between the gate of transistor Q1 and a pin that would be needed to couple the second rectified signal to charge gate-source capacitor Cgs. Also, this lowers the power dissipation and the pin count of the IC chip. Further, diode D5 is placed on-chip which reduces the bill of materials (BOM) that is needed to produce SMPS 100.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

The invention claimed is:

1. A system for a power supply, wherein the power supply is configured to (i) receive an alternating current voltage and (ii) supply an output voltage, the system comprising:
  a switch configured to
    receive the alternating current voltage; and
    charge, in response to the power supply (i) receiving the alternating current voltage and (ii) not supplying the output voltage, a capacitance to a first voltage;
    wherein the first voltage is output to a first circuit controlling the power supply; and
    wherein the first voltage is output to the first circuit while the power supply is (i) receiving the alternating current voltage and (ii) not supplying the output voltage; and
  a control circuit configured to deactivate the switch in response to the power supply (i) receiving the alternating current voltage and (ii) supplying the output voltage,
  wherein, in response to the control circuit deactivating the switch, (i) the switch stops charging the capacitance, and (ii) the first circuit receives the output voltage of the power supply.

2. The system of claim 1, further comprising the first circuit, wherein the first circuit is configured to:
  control the power supply based on the first voltage in response to the power supply (i) receiving the alternating current voltage and (ii) not supplying the output voltage, and
  control the power supply based on the output voltage in response to the power supply (i) receiving the alternating current voltage and (ii) supplying the output voltage.

3. The system of claim 1, wherein the switch is directly connected to a source of the alternating current voltage.

4. The system of claim 1, wherein in response to the control circuit deactivating the switch, the output voltage of the power supply charges the capacitance.

5. The system of claim 1, wherein:
  the control circuit is configured to activate the switch in response to the power supply (i) receiving the alternating current voltage and (ii) not supplying the output voltage, and
  the switch is configured to, in response to being activated, (i) charge the capacitance to the first voltage and (ii) output the first voltage to the first circuit until the power supply supplies the output voltage.

6. The system of claim 1, further comprising:
  the power supply,
  wherein the power supply is configured to (i) receive the alternating current voltage and (ii) supply the output voltage to a device, wherein the power supply is configured to (i) receive the alternating current voltage and (ii) not supply the output voltage to the device for a predetermined period in response to a source of the alternating current voltage being turned on, and wherein the control circuit is configured to activate the switch for the predetermined period in response to the source of the alternating current voltage being turned on.

7. The system of claim 1, further comprising:

the power supply, wherein the power supply is configured to (i) receive the alternating current voltage and (ii) supply the output voltage to a device, wherein the power supply is configured to (i) receive the alternating current voltage and (ii) not supply the output voltage to the device in response to the device being in a standby mode, and wherein the control circuit is configured to activate the switch in response to the device being in the standby mode.

8. The system of claim 1, further comprising:

the power supply, wherein the power supply is configured to (i) receive the alternating current voltage and (ii) supply the output voltage to a device, wherein the power supply is configured to (i) receive the alternating current voltage and (ii) not supply the output voltage to the device in response to the device being restarted subsequent to being powered down or being in a standby mode, and wherein the control circuit is configured to activate the switch in response to the device being restarted subsequent to being powered down or being in the standby mode.

9. A method for a power supply, wherein the power supply is configured to (i) receive an alternating current voltage and (ii) supply an output voltage, the method comprising:

receiving the alternating current voltage at a switch;

charging a capacitance to a first voltage via the switch in response to the power supply (i) receiving the alternating current voltage and (ii) not supplying the output voltage;

outputting the first voltage to a first circuit controlling the power supply;

outputting the first voltage to the first circuit while the power supply is (i) receiving the alternating current voltage and (ii) not supplying the output voltage;

deactivating the switch in response to the power supply (i) receiving the alternating current voltage and (ii) supplying the output voltage;

not charging the capacitance via the switch in response to deactivating the switch; and supplying the output voltage of the power supply to the first circuit.

10. The method of claim 9, further comprising:

controlling the power supply based on the first voltage in response to the power supply (i) receiving the alternating current voltage and (ii) not supplying the output voltage; and controlling the power supply based on the output voltage in response to the power supply (i) receiving the alternating current voltage and (ii) supplying the output voltage.

11. The method of claim 9, further comprising connecting the switch directly to a source of the alternating current voltage.

12. The method of claim 9, further comprising charging the capacitance using the output voltage of the power supply in response to deactivating the switch.

13. The method of claim 9, further comprising:

activating the switch in response to the power supply (i) receiving the alternating current voltage and (ii) not supplying the output voltage; and in response to the switch being activated, (i) charging the capacitance to the first voltage and (ii) outputting the first voltage to the first circuit until the power supply supplies the output voltage.

14. The method of claim 9, wherein the power supply is configured to (i) receive the alternating current voltage and (ii) supply the output voltage to a device, the method further comprising:

in response to the power supply (i) receiving the alternating current voltage and (ii) not supplying the output voltage to the device for a predetermined period subsequent to a source of the alternating current voltage being turned on, activating the switch for the predetermined period in response to the source of the alternating current voltage being turned on.

15. The method of claim 9, wherein the power supply is configured to (i) receive the alternating current voltage and (ii) supply the output voltage to a device, the method further comprising:

in response to the power supply (i) receiving the alternating current voltage and (ii) not supplying the output voltage to the device due to the device being in a standby mode, activating the switch in response to the device being in the standby mode.

16. The method of claim 9, wherein the power supply is configured to (i) receive the alternating current voltage and (ii) supply the output voltage to a device, the method further comprising:

in response to the power supply (i) receiving the alternating current voltage and (ii) not supply the output voltage to the device due to the device being restarted subsequent to being powered down or being in a standby mode, activating the switch in response to the device being restarted subsequent to being powered down or being in the standby mode.

\* \* \* \* \*